UNITED STATES PATENT OFFICE.

GEORG MERLING, OF ELBERFELD, AND HUGO KÖHLER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING KETO COMPOUNDS.

1,071,008. Specification of Letters Patent. Patented Aug. 19, 1913.

No Drawing. Original application filed October 8, 1912, Serial No. 724,635. Divided and this application filed November 13, 1912. Serial No. 731,142.

*To all whom it may concern:*

Be it known that we, GEORG MERLING and HUGO KÖHLER, doctors of philosophy, chemists, citizens of the German Empire, residing, respectively, at Elberfeld and Leverkusen, near Cologne, Germany, have invented new and useful Improvements in Processes of Producing Keto Compounds, of which the following is a specification.

The present invention concerns the production of keto compounds containing the radical

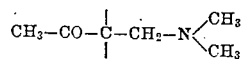

which have proved to be valuable intermediate products for the manufacture of erythrene and its homologues.

The process for their production consists in treating ketones such as acetone and its homologues with tetramethyldiaminomethane either with or without condensing agents, such as caustic alkalis, alkali carbonates and bicarbonates, alkaline earths, aluminium hydrate, sodium phosphate, organic bases and salts. The condensation proceeds, although slowly, even at ordinary temperature and without condensing agents, and the presence or absence of water or of other solvents does not interfere with the reaction. Heating and condensing agents accelerate the reaction. Tetramethyldiaminomethane can be used as such or as mixtures of formaldehyde- and dimethylamin solutions in the proper molecular proportions or in the latter case also *in statu nascendi*. These reaction proceeds *e. g.* according to the following equation:—

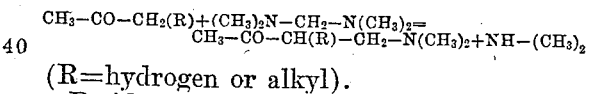

(R=hydrogen or alkyl).

Besides these products ketodiamins of the formula:

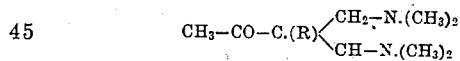

are obtained by the two-fold introduction of the residue $-CH_2-N(CH_3)_2$ into the corresponding ketone. These ketodiamins can be separated from the ketomonoamins by fractional distillation.

In order to illustrate the new process more fully the following examples are given, the parts being by weight:—

*Example 1—Production of beta-acetylpropyl-dimethylamin and beta-beta-acetylmethyltrimethylenetetramethyldiamin from tetramethyldiaminomethane and methylethylketone.*—750 parts of aqueous formaldehyde (40 per cent.) are gradually dropped into 1350 parts of an aqueous dimethylamin solution (58.77 per cent.) care being taken to stir well and cool during this operation and 2500 parts of methylethylketone and 100 parts of caustic soda lye (1 per cent.) are added to the solution of tetramethyldiaminomethane thus obtained. After this solution has been heated to 30° C. for about 20 days the pungent smell of tetramethyldiaminomethane has disappeared. The light red solution is saturated with carbonic acid or bicarbonate is added to it, the bases and the excess of methylethylketone are separated and dried with potash. The two bases are separated from each other by a fractional distillation *in vacuo*. In this way about 700 parts of beta-acetylpropyldimethylamin and 100 parts of beta-beta-acetylmethyltrimethylenetetramethyldiamin are obtained. The same products but with a considerably smaller yield are obtained by boiling under a reflux condenser for 4 days equal molecules of ethylmethylketone and pure tetramethyldiaminomethane of the boiling point 85°.

*Example 2—Production of beta-acetylethyldimethylamin and beta-acetyltrimethylenetetramethyldiamin from tetramethyldiaminomethane and acetone.*—750 parts of aqueous formaldehyde (40 per cent.) are gradually dropped into 1530 parts of aqueous dimethylamin solution (58.77 per cent.) which is being stirred and cooled and 2000 parts of acetone, 400 parts of baryta water (saturated at ordinary temperature) and 500 parts of water are then added. After 20 days' heating from 25 to 30° C. bicarbonate is added to the brown solution in order to remove the baryta. Barium carbonate is removed by filtration. The oil is separated with potash from the filtrate, dried and is worked up as described in Example 1.

About 700 parts of the mixture of crude bases boiling at from 50 to 93° C. (19 mm.) are obtained, containing 80 per cent. of beta-acetylethyldimethylamin and 20 per cent. of beta-acetyltrimethylenetetramethyldiamin.

The present application is a division of our prior application Serial No. 724,635.

We claim:—

1. Process for producing keto compounds containing the radical:

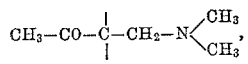

which process consists in first treating a ketone with a tetramethyldiaminomethane compound and then isolating the keto compounds produced, substantially as described.

2. Process for producing keto compounds containing the radical:

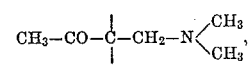

which process consists in first treating a ketone with a tetramethyldiaminomethane compound with the addition of a condensing agent and then isolating the keto compound produced, substantially as described.

In testimony whereof we have hereunto set our hands in the presence of two subscribing witnesses.

GEORG MERLING. [L. S.]
HUGO KÖHLER. [L. S.]

Witnesses:
HELEN NUFER,
ALBERT NUFER.